Patented May 16, 1950

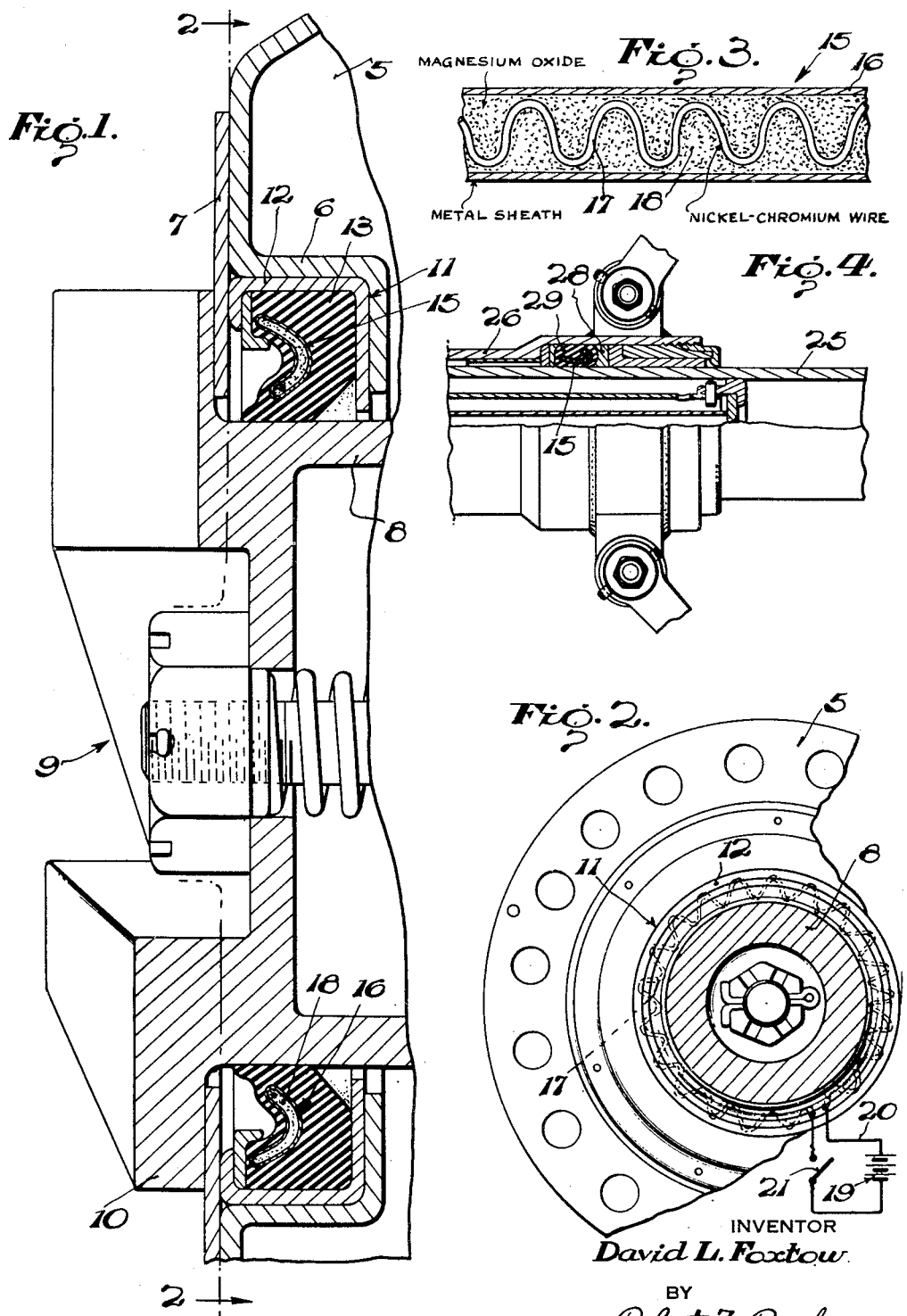

2,507,895

UNITED STATES PATENT OFFICE 2,507,895

SEALING MEANS

David L. Foxtow, Brooklyn, N. Y., assignor to Bendix Aviation Corporation, Teterboro, N. J., a corporation of Delaware Application February 20, 1945, Serial No. 578,907

1 Claim. (Cl. 288—3)

My invention relates to sealing means and more particularly to means and a method for eliminating or rupturing a bond formed by the freezing of a fluid between a seal and an adjacent part or member whereby to facilitate relative movement between the seal and member.

In initiating the operation of aircraft devices and mechanisms, considerable difficulty and oftentimes failure is experienced due to the fact that the lubricant or oil utilized is of a necessity provided with paraffin base which often freezes and forms a paraffinic precipitate when subjected to relatively low temperature, either on the ground or in the air, thereby providing a bond which retards the operation of the device or mechanism until the bond has been ruptured or dissolved by a higher temperature. This is especially true in conjunction with aircraft engine starters and landing gear mechanisms wherein seals are employed between relatively movable parts or members to preclude the passage of lubricant between the parts. Inasmuch as a lower viscosity oil cannot be used, because it would lower the efficiency of the devices or mechanisms, the alternative usually resorted to has been the continuous application of power to the device or mechanism in an endeavor to rupture the seal and effect the operation.

The aforementioned continuous application of power not only reduces the available power supply but also consumes considerable time which, in a great many instances, is of prime importance, for instance, in the operation of the landing gear when it is desired to make a quick or emergency landing, or the starting of the aircraft engine for a quick take-off preceding or during military operations. My invention overcomes these difficulties and disadvantages, it being one of the objects thereof to provide means so constructed and arranged as to insure the quick rupture of the bond to permit operation of the device or mechanism within a minimum of time and thus conserve the source of power.

Another object of my invention is to provide a method of quickly eliminating or rupturing the bond and thus preclude retardation of the operation of the device or mechanism over a relatively long period.

An important object of my invention is to provide means of the foregoing described character which is simple in construction, durable in use, easy of installation, efficient in operation, economical in manufacture and which lends itself to high productivity.

With the above and other objects in view, as will hereinafter appear, the invention consists in the combination, and arrangement of parts hereinafter set forth and illustrated in the accompanying drawings, from which the several features of the invention and the advantages attained thereby will be readily understood by those skilled in the art.

Referring to the drawings wherein like reference characters designate like parts throughout the several views.

Figure 1 is an enlarged longitudinal sectional view of an end portion of an engine starter having my invention applied thereto.

Figure 2 is a sectional view on a scale reduced from the scale of Figure 1, taken on the line 2—2 of Figure 1.

Figure 3 is a detail sectional view of a portion of the heating unit.

Figure 4 is a fragmentary view, partly in section, of a landing gear component having my invention applied thereto.

In practicing my invention, as illustrated in Figures 1 to 3 of the drawings, I utilize an engine starter, for instance, of the general type disclosed in U. S. Patent No. 2,347,788, issued to R. M. Nardone on May 2, 1944, the end section or baffle plate 5 of the starter being formed on its outer radial face with an inwardly disposed portion 6 of substantially cup-shape and provided with a retaining plate 7. The portion 6 and the plate 7 are centrally apertured and have extending therethrough the shank 8 of a jaw clutch element 9 equipped with a toothed head 10 disposed outwardly of the baffle plate 5 and which jaw clutch element is axially movable and rotatable with respect to the end section 5 for actuation into engagement with an element carried by an engine for cranking the latter, the jaw clutch element 9 extending into the crank case or the like of the engine and wherein lubricant is contained.

The portion 6 has disposed therein a seal 11 comprising a ring-like casing 12 which is disposed about the shank 8 of the jaw clutch element and out of engagement therewith. The casing 12 retains therein a packing member or gasket 13 constructed of resilient, yieldable or pliable material, for instance, rubber or neoprene, although any other suitable material may be employed. The member 13 embraces the shank 8 of the element 9 and is maintained in substantially compressed relation therewith thus enabling the seal to prevent lubricant from the crank case seeping into the starter.

The lubricant or oil employed in the crank case of an engine to which the starter is connected is of a type having a paraffin base which when frozen forms a bond between the member 13 and the shank 18 and which bond serves to preclude initial operation of the jaw clutch element towards the engine for cranking the same. In order to eliminate or rupture the bond, the member 13 has incorporated therein a heating unit 15 comprising a pliable metallic casing or sheath 16 in which is encased a convoluted nickel-chromium wire 17 which extends longitudinally through the sheath and a body of magnesium oxide, said wire being isolated from the sheath and having its ends, as diagrammatically illustrated in Figure 2 of the drawing, connected to a source of electrical energy, such as a battery 19, by wiring 20. A switch 21 is disposed in circuit with the heating unit and the source of electrical energy 19 for controlling the energization and deenergization of the heating unit when operated to the "on" and "off" positions respectively. While I have illustrated the heating unit as being connected directly with the source of electrical energy, it is to be understood that the heating unit may be connected in circuit with the starter motor and in such a manner as to be energized in advance of the initial operation of the element.

As illustrated in Figure 4 of the drawing, a hydraulic nose wheel shock strut of a landing gear is provided with a pair of inner and outer telescoping members 25 and 26 respectively, the outer member 26 being formed with a recess in which is disposed a seal 28 provided with a flexible element or member 29. The member 29 is preferably constructed of rubber, neoprene or the like and is retained within the recess and has sealing engagement with the inner member 25 for precluding the leakage of fluid between the members 25 and 26. Incorporated or embedded within the member 29 is the heating unit 15 which functions to rupture the bond between the members 25 and 26 as heretofore described in connection with Figures 1 to 3.

Without further elaboration the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

It is obvious that the invention is not confined to the herein described use therefor as it may be utilized for any purpose to which it is adaptable. It is therefore to be understood that the invention is not limited to the specific construction as illustrated and described as the same is only illustrative of the principles of operation, which are capable of extended application in various forms, and that the invention comprehends all construction within the scope of the appended claim.

What I claim is:

A ring seal unit comprising a molded yieldable ring body of rubber or the like having an end face of substantially C-shape in cross section facing axially in one direction, a hollow thin sheet-metal ring-like sheath coaxial with the yieldable ring and of substantially C-shape in cross section embedded in the body facing axially in the same direction, electrical resistor means in the sheath, and insulating material around the resistor means in the sheath.

DAVID L. FOXTOW.

REFERENCES CITED

The following references are of record in the file of this patent:

UNITED STATES PATENTS

| Number | Name | Date |
| --- | --- | --- |
| 1,359,400 | Lightfoot | Nov. 16, 1920 |
| 2,088,703 | Hubbard et al. | Aug. 3, 1937 |
| 2,131,927 | Wenzel | Oct. 4, 1938 |
| 2,316,121 | Nardone | Apr. 6, 1943 |

FOREIGN PATENTS

| Number | Country | Date |
| --- | --- | --- |
| 57,132 | Switzerland | of 1911 |